United States Patent

[11] 3,590,276

| [72] | Inventor | John D. Watson |
| | | Purbrook, Portsmouth, England |
| [21] | Appl. No. | 818,940 |
| [22] | Filed | Apr. 24, 1969 |
| [45] | Patented | June 29, 1971 |
| [73] | Assignee | Westinghouse Electric Corporation |
| | | Pittsburgh, Pa. |

[54] CIRCUIT FOR PRODUCING AN ELECTRICAL PULSE WHICH OCCURS AT SOME FIXED PHASE ANGLE WITH RESPECT TO AN ALTERNATING CURRENT INPUT VOLTAGE
10 Claims, 4 Drawing Figs.

[52] U.S. Cl............................................ 307/232,
307/233, 307/236, 307/262, 307/295
[51] Int. Cl........................................... H03k 5/20,
H03k 1/12
[50] Field of Search............................ 307/232,
233, 236, 262, 295

[56] References Cited
UNITED STATES PATENTS

| 3,046,414 | 7/1962 | Meissen | 307/262 |
| 3,069,558 | 12/1962 | Burt et al | 307/295 X |
| 3,213,291 | 10/1965 | Reid | 307/262 X |
| 3,497,816 | 2/1970 | Fritz et al. | 307/233 X |

*Primary Examiner*—Stanley D. Miller, Jr.
*Attorneys*—F H. Henson, R. G. Brodahl and C. J. Paznokas ABSTRACT: Described is apparatus for generating an electrical pulse each time an input alternating current signal passes through a complete 360° cycle, the pulse having a fixed phase angle with respect to the zero crossing starting point of each 360° cycle. This is accomplished by means of a resistance-capacitance network in which the capacitor is connected across the emitter-base junction of a switching transistor. When an alternating current input is applied across the resistance-capacitance network, the capacitor will charge only when the emitter-base junction is reverse biased. When the voltage waveform across the capacitor reaches the zero crossing point, the transistor will fire to produce an output pulse. Since this waveform across the capacitor lags the input alternating current waveform by an amount dependent upon the time constant of the resistance-capacitance network, the pulses produced at the output of the transistor switch will always bear a fixed phase relationship with respect to the alternating current input.

INVENTOR
John D. Watson

CIRCUIT FOR PRODUCING AN ELECTRICAL PULSE WHICH OCCURS AT SOME FIXED PHASE ANGLE WITH RESPECT TO AN ALTERNATING CURRENT INPUT VOLTAGE

BACKGROUND OF THE INVENTION

There are many applications in electrical circuits where it is necessary to produce an electrical pulse which occurs at some fixed phase angle with respect to an alternating current input voltage. Such applications include, for example, phase detectors, directional power detectors and firing pulse generators.

In the past, such phase determining circuits have sometimes taken the form of zero crossing detectors which, when the input alternating current voltage crosses zero, start a time delay corresponding to the required phase angle. Such circuits, however, are fairly complex and are subject to errors in the final phase angle due to noise at the zero crossing. Furthermore, zero crossing detectors are strongly dependent upon input frequency. That is, such zero crossing detectors ordinarily sense the leading edge of a waveform after it passes through zero. As the frequency of the input wave shape decreases, the rate of rise of this leading edge varies, thereby introducing delays into the circuitry for detecting the leading edge.

Another prior art phase determining circuit employs a phase locked relaxation oscillator of fixed mark-space ratio, one transition occurring at, say, the zero crossing of the input waveform and the other at the desired phase angle. Such a phase determining circuit, however, is very complex and is slow in tracking input phase changes.

Still another prior art arrangement for determining phase is to use a simple phase-shift circuit, then detect the zero crossing. However, for phase-shifts near 90°, any simple phase-shift network so attenuates the signal that a zero crossing detector of great accuracy is necessary. Here, again, the phase angle is strongly dependent upon frequency since the zero crossing must be detected.

Other and different types of phase determining circuits have been devised, but all of these are extremely complex or are not capable of generating pulses over the entire 360° cycle of an input waveform.

SUMMARY OF THE INVENTION

As one object, the present invention seeks to provide a novel phase determining circuit which is extremely simple in construction but at the same time overcomes the foregoing and other disadvantages of prior art circuits of this type.

Another object of the invention is to provide phase determining circuit apparatus which is extremely accurate over a wide range of frequencies and amplitudes of an input alternating current voltage.

Still another object of the invention is to provide a phase determining circuit which is essentially of an integrating nature, thereby giving good noise immunity.

In accordance with one embodiment of the invention, there is provided a semiconductor switch device for example a transistor switch device having a control electrode and two other terminals, a source of driving potential connected between said other terminals of the transistor switch, a pair of input terminals to which an alternating current input voltage is applied, a resistor and a capacitor connected in series across the input terminals, means connecting one end of the capacitor to the control electrode of said switch device, and means connecting the other end of the capacitor to one of said other terminals of the switch device.

Preferably, the capacitor is connected between the base and a grounded emitter of a transistor switch device such that it will charge only when the emitter-base junction of the transistor is reverse biased. The essentially sinusoidal voltage excursion across the capacitor, which occurs when the base-emitter junction is reverse biased, lags the input alternating current voltage by a phase angle determined by the time constant of the resistance-capacitance network. When this waveform reaches the zero crossing point, at a time following the zero crossing of the applied input waveform, the transistor fires to produce an output pulse. This action repeats during each 360° cycle of the input waveform, thereby producing a series of pulses each of which are spaced in phase from the starting point of each cycle of the input alternating current waveform by a fixed phase angle.

The above and other objects and features of the invention will become apparent from the following detailed description taken in connection with the accompanying drawings which form a part of this specification, and in which:

FIG. 1 is a schematic diagram of a simplified embodiment of the invention shown herein primarily for purposes of illustration;

FIG. 2 comprises waveforms occurring at various points in the circuit of FIG. 1;

Figure 1:
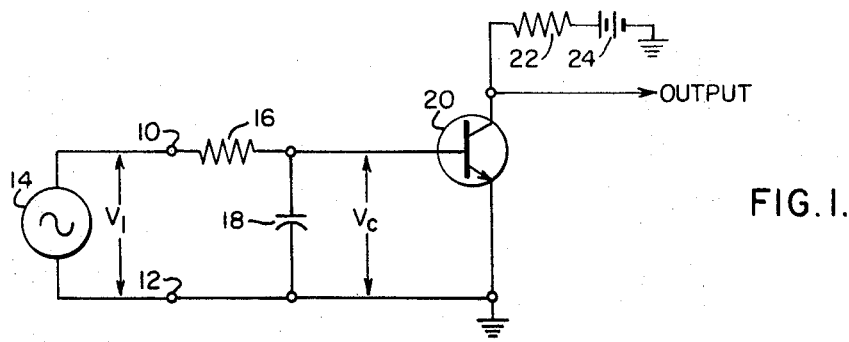

With reference now to the drawings, and particularly to FIG. 1, the circuit shown includes a pair of input terminals 10 and 12 connected to a source of alternating current voltage 14, the voltage from the source 14 being identified as $V_1$. Connected between the terminals 10 and 12 is a resistance-capacitance network comprising resistor 16 in series with capacitor 18. The capacitor 18, in turn, is connected between the emitter and base of an NPN transistor 20. The emitter of transistor 20 is grounded as shown; while its collector is connected through load resistor 22 to a source of driving potential, such as battery 24.

The voltage existing across the capacitor 18 is identified in FIG. 1 as $V_c$. Operation of the circuit may best be understood by assuming that the base-emitter diode of transistor 20 is ideal and by reference to FIG. 2 where the voltage waveforms $V_1$ and $V_c$ are shown for one and one-half cycles of the applied input waveform. It will be noted that due to the resistance-capacitance time constant of the network comprising elements 16 and 18, the voltage waveform $V_c$ lags the waveform $V_1$. At time $t_1$, for example, the input voltage waveform $V_1$ crosses the zero axis in the positive-going direction. However, the voltage waveform $V_c$ across capacitor 18 does not reach the zero axis until time $t_2$. Until the voltage waveform $V_c$ reaches the zero axis, the base-emitter junction of transistor 20 is reverse biased. However, as soon as the voltage waveform $V_c$ intersects the zero axis, the transistor 20 will turn ON and the voltage $V_c$ across the capacitor 18 will be clamped to near zero or ground by the base-emitter junction of transistor 20 which is now biased in the forward direction. When the input waveform $V_1$ goes negative at time $t_3$, the voltage $V_c$ across capacitor 18 also goes negative; and when the voltage $V_c$ coincides with the voltage $V_1$ at time $t_4$, voltage $V_c$ begins to move positively again, finally intersecting the zero axis at some phase angle $\alpha$ with respect to the negative-going zero crossing of the input waveform $V_1$. With respect to the positive-going zero crossing of the input voltage, the phase angle, of course, is $\alpha+180°$. While the voltage $V_c$ is negative, the transistor 20 is turned OFF such that the point where transistor 20 again turns ON gives the required phase angle indication.

Figure 4:
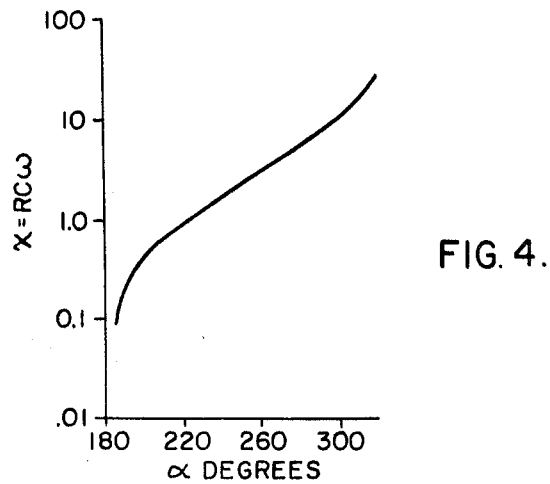
FIG. 4 is a plot of phase angle versus frequency for the circuit of FIG. 3.

The relationship between the phase angle $\alpha$ and the time constant of resistor 16 and capacitor 18 is shown in FIG. 4, where $X=RC\omega$, in which R=resistance in time of resistor 16, C=capacitance of capacitor 18 in farads, and $\omega=2\pi f$. By way of example $V_1$=115 volts R.M.S., at 60~/sec. In such case $2\pi f$ =377, the figure employed in the chart of FIG. 4. From the chart it is seen that either resistor 16 or capacitor 18 may be changed to change the phase angle $\alpha$. By way of example R may be 150,000Ω and C may be 0.022 mfd. In which case for 60·, $X=RC\omega=1.24$ which relates to $\alpha=233°$ on the chart in FIG. 4.

Figure 3:
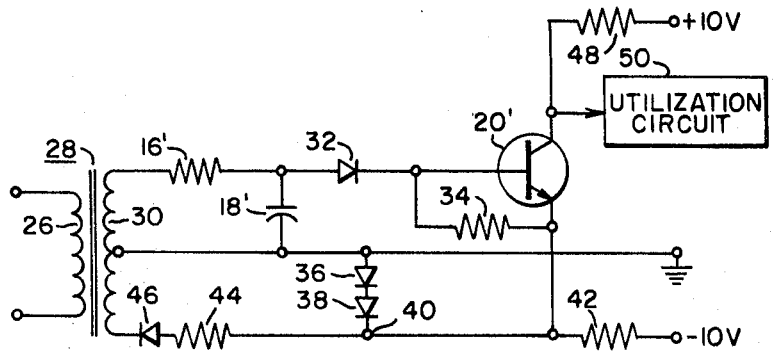
FIG. 3 is an illustration of a preferred embodiment of the invention.

Because the base-emitter junction of a transistor is not in practice ideal, a practical embodiment of the invention will be that shown in FIG. 3 wherein the input alternating current signal is applied to the primary winding 26 of transformer 28. The secondary winding 30 of transformer 28 is center tapped, this center tap being connected to ground as shown. The upper end of secondary winding 30 is connected through resistor 16', corresponding to resistor 16 in FIG. 1, and diode 32 to the base of transistor 20', corresponding to transistor 20 in FIG. 1. In series with resistor 16' across the upper half of secondary winding 30 is a capacitor 18', corresponding to capacitor 18 in FIG. 1.

As was mentioned above, the base-emitter junction of the transistor 20' is not practice ideal. Therefore, the diode 32 is added in series with the base of transistor 20 to support the reverse voltage. Furthermore, a resistor 34 is connected between the emitter and base of transistor 20'. In order that the voltage $V_c$ will remain clamped at zero, the emitter is biased two diode drops below ground level by means of diodes 36 and 38 connected between ground and point 40 which is connected through resistor 42 to a source of −10 volts, and through resistor 44 and diode 46 to the lower end of secondary winding 30. The collector of transistor 20' is connected through resistor 48 to a source of +10 volts and is also connected to a utilization circuit 50. As will be understood, when transistor 20' conducts, the voltage at its collector drops abruptly and remains at the reduced value until it is again cut off. The output of the apparatus may be connected to any utilization circuit 50. The output may be used as is, or for special shaping or production of special pulses. The utilization circuit may include a pulse shaper, such as a differentiator or other, or a pulse generator such as a one shot or other. The utilization circuit 50 may comprise a gate device or circuit controlled by the output of transistor 20.

The diode 46 protects the base-emitter diode junction of transistor 20' against reverse breakdown. If the −10 volt supply has sufficient current capability, diode 46, resistor 44 and the lower half of the transformer secondary winding 30 would be unnecessary, since resistor 42 would supply sufficient current to keep diodes 36 and 38 forward biased. In this particular case, resistor 42 keeps the diodes 36 and 38 forward biased at the zero crossings and during the negative half cycles. However, during the positive half cycles, diode 46 and resistor 44 provide the larger current needed to forward bias diodes 36 and 38. As will be appreciated, the particular embodiments of the invention shown herein utilize an NPN transistor. However, the NPN transistor could be replaced by other suitable semiconductor switch devices, for example, a PNP transistor with all polarities reversed, a thyristor, or other.

Figure 2:
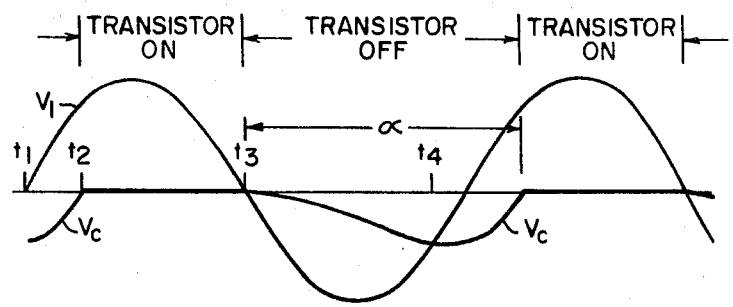

The relationship between the phase angle $\alpha$ of FIG. 2 and the time constant of the resistance-capacitance network of elements 16' and 18' is the same as that in FIG. 4. From an inspection of the curve of FIG. 4, it will be seen that at 270° phase shift, for example, a 5 percent change in the product $RC\omega$ causes only a 2 percent change in $\alpha$. The circuit, therefore, is more insensitive to frequency changes than some alternative solutions and is certainly good enough for use with a 60-cycle power line input.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for generating an electrical pulse which occurs at some fixed phase angle with respect to an alternating current input voltage, the combination of a semiconductor switch device having a control electrode and two other electrodes, a source of driving potential connected between said other electrodes of the switch device, a pair of input terminals to which said alternating current input voltage is applied, a resistor and a capacitor connected in series across said input terminals whereby one end of the resistor is connected to one end of the capacitor, noncapacitive means connecting said one end of the capacitor to said control electrode, diode means connecting the other end of the capacitor to a first of said other electrodes of the switch device, and output terminals connected to a second of said other electrodes and said other end of the capacitor respectively and across which said pulse appears.

2. The combination of claim 1 wherein said switch device is a transistor and said control electrode is the base of the transistor.

3. The apparatus of claim 2 wherein the other end of said capacitor is connected to the emitter of said transistor through said diode means.

4. The apparatus of claim 3 wherein said source of driving potential has one terminal connected through a resistor to the collector of said transistor and its other terminal connected to the emitter of said transistor.

5. The apparatus of claim 2 including a diode connecting said one end of the capacitor to said base.

6. In apparatus for generating an electrical pulse which occurs at some fixed phase angle with respect to an alternating current input voltage, the combination of an input transformer having a primary winding adapted for connection to said alternating current input voltage, said transformer having a secondary winding provided with end terminals and a grounded terminal therebetween, a semiconductor switch device having a control electrode and two other electrodes, a source of driving potential connected between said other electrodes of the switch device, a resistor and a capacitor connected in series between one end terminal of said secondary winding and said grounded terminal whereby one end of the resistor is connected to one end of the capacitor, means connecting said one end of the capacitor to said control electrode, diode means connecting the other end of the capacitor to one of said other electrodes of the switch device, and means connecting the other end terminal of said secondary winding to said one of the other electrodes of said switch device.

7. The apparatus of claim 6 wherein said grounded terminal is connected to a midtap on said secondary winding, and including a unidirectional current device connecting said one end of the capacitor to said control electrode, said diode means comprising a pair of diodes in series.

8. The apparatus of claim 6 wherein said last-named means includes a diode and resistor in series.

9. The apparatus of claim 6 including a utilization circuit connected to the collector of said transistor.

10. The apparatus of claim 6 including a resistor connected between the emitter and base of said transistor switch device.